US012695145B2

(12) United States Patent
Ohta

(10) Patent No.: US 12,695,145 B2
(45) Date of Patent: Jul. 28, 2026

(54) BATTERY STORAGE TRAY

(71) Applicant: SANYO Electric Co., Ltd., Kadoma (JP)

(72) Inventor: Atsushi Ohta, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 606 days.

(21) Appl. No.: 18/032,428

(22) PCT Filed: Oct. 21, 2021

(86) PCT No.: PCT/JP2021/038896
§ 371 (c)(1),
(2) Date: Apr. 18, 2023

(87) PCT Pub. No.: WO2022/091926
PCT Pub. Date: May 5, 2022

(65) Prior Publication Data
US 2023/0395914 A1 Dec. 7, 2023

(30) Foreign Application Priority Data
Oct. 28, 2020 (JP) ................................. 2020-180472

(51) Int. Cl.
*H01M 50/213* (2021.01)
*H01M 50/227* (2021.01)
*H01M 50/383* (2021.01)
(52) U.S. Cl.
CPC ....... *H01M 50/213* (2021.01); *H01M 50/227* (2021.01); *H01M 50/383* (2021.01)

(58) Field of Classification Search
None
See application file for complete search history.

(56) References Cited

U.S. PATENT DOCUMENTS

| | | | |
|---|---|---|---|
| 5,799,934 A | 9/1998 | Kouda et al. | |
| 2019/0044109 A1 | 2/2019 | Sugimoto et al. | |
| 2022/0149472 A1* | 5/2022 | Foreman | H01M 50/267 |

FOREIGN PATENT DOCUMENTS

| | | |
|---|---|---|
| JP | 8-185844 A | 7/1996 |
| JP | 2000-173567 A | 6/2000 |
| JP | 2017-98115 A | 6/2017 |
| WO | 2017/145796 A1 | 8/2017 |

OTHER PUBLICATIONS

International Search Report dated Nov. 30, 2021, issued in counterpart International Application No. PCT/JP2021/038896 (2 pages).

* cited by examiner

*Primary Examiner* — Maria Laios
(74) *Attorney, Agent, or Firm* — WHDA, LLP

(57) ABSTRACT

This battery storage tray is provided with: a bottom plate which supports a plurality of batteries; a side wall which extends from the outer peripheral part of an upper surface of the bottom plate in the thickness direction of the bottom plate so as to surround a stage surface for the plurality of batteries in the upper surface, thereby defining a battery storage space, in which the plurality of batteries are contained, together with the bottom plate; and a plate-like permanent magnet which is affixed to at least a part of a bottom surface of the bottom plate.

5 Claims, 8 Drawing Sheets

Figure 1

BATTERY STORAGE TRAY

CROSS-REFERENCE TO RELATED APPLICATION

This application is a National Phase Application filed under 35 U.S.C. § 371 of International Application No. PCT/JP2021/038896 filed on Oct. 21, 2021 which claims the benefit of priority under 35 U.S.C. § 119(a) of Japanese Patent Application No. 2020-180472 filed in Japan on Oct. 28, 2020, the contents of which are incorporated herein by reference.

TECHNICAL FIELD

The present disclosure relates to a battery housing tray.

BACKGROUND ART

Patent Literature 1 discloses a conventional battery housing tray. The battery housing tray comprises an inner partition body having a plurality of partitioned housing parts, and an outer frame body arranged so as to surround the inner partition body, and allows housing of a plurality of batteries at the same time.

CITATION LIST

Patent Literature

PATENT LITERATURE 1: Japanese Unexamined Patent Application Publication No. 2000-173567

SUMMARY

Technical Problem

In recent years, batteries are used as a power source for electric vehicles (EVs) and large-scale power storage facilities, and research and development to increase the capacity of the batteries is progressing. Such high-capacity batteries have a structure to enhance safety by partially breaking their sealing plates or bottoms to discharge (vent) high-temperature gas to the outside, when any trouble occurs to cause the batteries to generate abnormal heat and cause the internal pressure inside the batteries to become excessively high. In transportation of batteries, for example, a plurality of battery housing trays, housing a large number of batteries in closer contact with each other, are concurrently moved in the state of being stacked, so as to perform effective transportation of a large number of batteries.

Under such background circumstances, there are cases where one of the batteries housed in the battery trays generates abnormal heat during the time such as transportation of the batteries. Even in such cases, if it is possible to suppress the effect of abnormal heat generation from affecting other batteries in the same battery housing tray or batteries housed in other battery housing trays, it is of great significance as the safety can be enhanced.

Therefore, it is an advantage of the present disclosure to provide a battery housing tray that closely houses a plurality of batteries and that suppresses the effect of abnormal heat generation from affecting other batteries, if one battery should generate abnormal heat in the state where the plurality of battery housing trays are stacked.

Solution to Problem

In order to accomplish the above object, a battery housing tray according to the present disclosure comprises a bottom plate that supports a plurality of batteries, a side wall that defines a battery housing space for housing the plurality of batteries together with the bottom plate, the side wall extending in a thickness direction of the bottom plate from an outer edge of an upper surface of the bottom plate so as to surround a mounting surface of the plurality of batteries, and a plate-shaped permanent magnet fixed to at least part of a bottom surface of the bottom plate.

Advantageous Effects of Invention

The battery housing tray according to the present disclosure can closely house a plurality of batteries and suppress the effect of abnormal heat generation from affecting other batteries, if one battery should generate abnormal heat in the state where the plurality of battery housing trays are stacked.

BRIEF DESCRIPTION OF DRAWINGS

FIG. 1 is a side elevation view of a battery housing tray according to an embodiment of the present disclosure.

DESCRIPTION OF EMBODIMENTS

Figure 2:
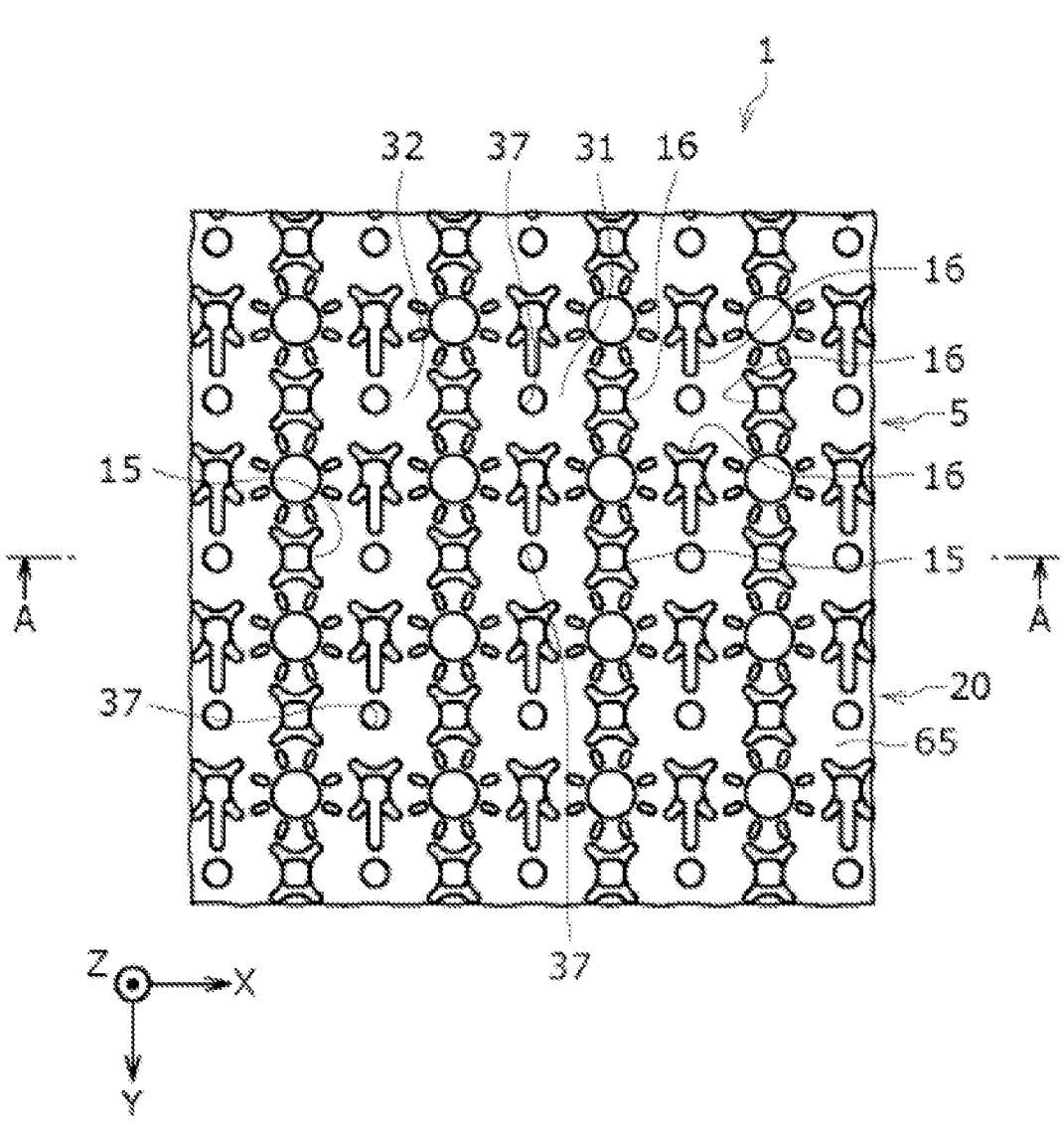
FIG. 2 is a fragmentary expanded plan view of the battery housing tray as viewed from the upper side in the thickness direction and is also an expanded plan view for describing an example of the structure of housing parts for cylindrical batteries in a battery housing space.

Hereinbelow, an embodiment of the present disclosure will be described in detail with reference to the accompanying drawings. When a plurality of embodiments or modifications are included in the following description, it is assumed from the beginning that a new embodiment is constructed by combining their characteristic portions as appropriate. In the examples below, like component members are designated by like reference numerals to omit redundant explanation. The plurality of drawings also includes schematic drawings, and throughout the different drawings, dimensional ratios, such as length, width, and height, do not necessarily match.

In the following description, for the sake of convenience, a battery inserting side in a height direction may be expressed as upper side or upward in the height direction, and a battery receiving side in the height direction may be expressed as lower side or downside in the height direction. In the embodiment below, description is given of the case where battery housing trays 1 have housing parts 15 arranged in matrix, and the housing parts 15 have shapes suitable for housing cylindrical batteries 10. Here, X direction is a row direction of the housing parts 15 arranged in matrix, Y direction is a column direction of the housing parts 15 arranged in matrix, and Z direction is a height direction of the battery housing trays 1. The X, Y and Z directions are orthogonal to each other.

In the battery housing trays in the present disclosure, the housing parts may have a shape suitable for housing rectangular batteries, and the battery housing trays may be configured to house the rectangular batteries. Alternatively, in the battery housing tray in the present disclosure, the housing parts may have a shape capable of housing both the cylindrical batteries and the rectangular batteries. The battery housing tray may house both the cylindrical batteries and the rectangular batteries. The battery housing tray in the present disclosure may not have the plurality of defined housing parts, and may be structured to allow adjacent batteries to come in contact with each other. Moreover, among the component members described below, those not included in an independent claim representing the highest-level concept are optional component members and are not essential component members.

Figure 1:
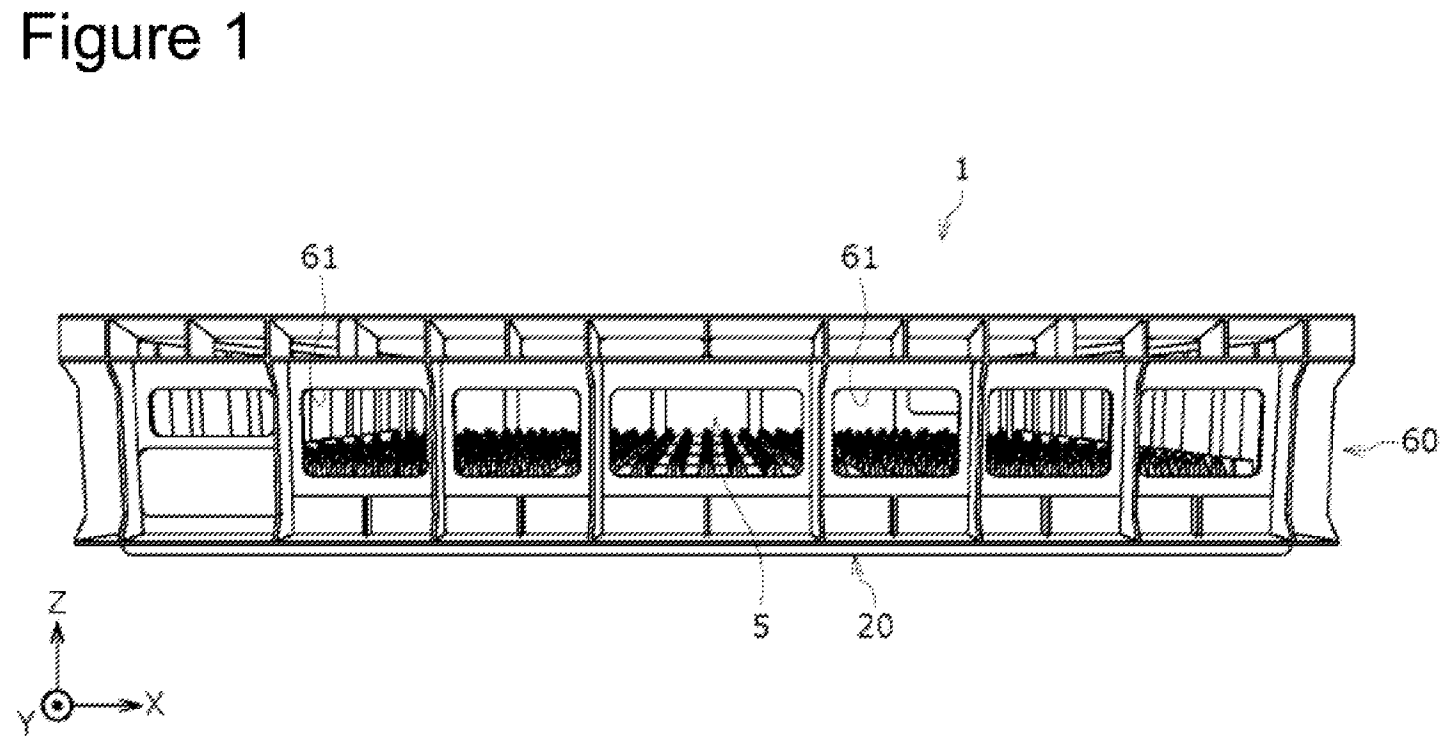

FIG. 1 is a side elevation view of the battery housing tray 1 according to an embodiment of the present disclosure. FIG. 2 is a fragmentary expanded plan view of the battery housing tray 1 as viewed from the upper side in the thickness direction (coincident with Z direction) of a bottom plate 65, and is also an expanded plan view for describing the structure of the housing parts 15 for the cylindrical batteries 10 (see FIG. 3) in a battery housing space 5. In the present embodiment, the battery housing tray 1 has a generally rectangular shape in plan view as viewed from upward in Z direction, though the shape of the battery housing tray in plan view may be any shape without being limited to the rectangular shape. The battery housing tray 1 is formed from, for example, resin materials such as polyimide, polyphenylene ether, polyphenylene sulfide, and polycarbonate, though the battery housing tray 1 may also be formed from metal materials such as stainless steel.

As shown in FIG. 1, the battery housing tray 1 comprises a plate-shaped mounting part 20 that supports the cylindrical batteries (hereinafter simply referred to as "batteries") 10, and a side wall 60. The side wall 60 extends in Z direction from a generally rectangular outer edge of an upper surface 31 (see FIG. 2) of the mounting part 20 so as to surround the entire circumference (or generally the entire circumference) of a mounting surface 32 (see FIG. 2) of the batteries 10 on an upper surface 31. The side wall 60, together with the mounting part 20, defines a battery housing space 5 to house the plurality of batteries 10. As shown in FIG. 1, the side wall 60 has a plurality of windows 61 that are spaced apart from each other in its circumferential direction. The windows 61 penetrate the side wall 60 in a direction orthogonal to Z direction. The windows 61 are provided, for example, to reduce material costs of the battery housing tray 1, to reduce the weight of the battery housing tray 1, and to check the housing state of the batteries 10 from lateral sides when the battery housing trays 1 are stacked for transportation of a large number of batteries 10. Note that the battery housing tray in the present disclosure may have no window.

As shown in FIG. 2, the battery housing space 5 has the housing parts 15 for housing the respective batteries 10, the housing parts 15 being spaced apart from each other. The housing pails 15 are arranged in matrix as described above, and each of the housing parts 15 has four battery supports 16 spaced from each other. The four battery supports 16 are protrusions that protrude upward in Z direction from the upper surface 31. The battery supports 16 limit the movement of the batteries 10 in X and Y directions by supporting four positions located on the lateral side of the battery 10 housed in the housing parts 15 at generally equal intervals in the circumferential direction. The battery housing tray 1 has through holes (cylindrical holes) 37 extending in Z direction at the center of the bottom of the respective housing parts 15. The through holes 37 are provided for allowing insertion of terminals to charge the batteries 10 housed in the battery housing tray 1. The batteries 10 are chargeable in the state of being housed in the battery housing tray 1.

Note that the structure of the housing parts is not limited to the structure described in FIG. 2, any may be any structure as long as the movement of the batteries can be limited. Alternatively, the battery housing tray may not have the plurality of defined housing parts as described above, and may be structured to allow adjacent batteries in the battery housing space to come into contact with each other. The battery housing tray may have no through hole in the mounting part, and may be structured such that the batteries 10 housed in the battery housing tray 1 are not chargeable.

Figure 3:
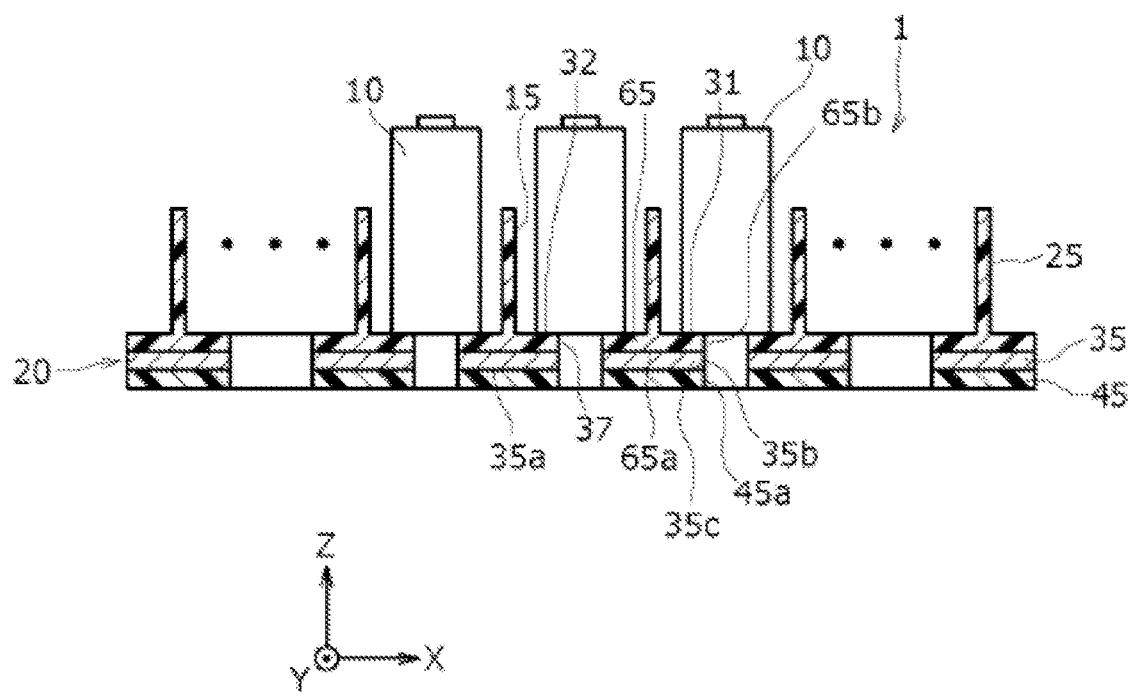
FIG. 3 is a schematic sectional view of the battery housing tray along A-A line in FIG. 2, the battery housing tray housing the cylindrical batteries in the respective housing parts.

FIG. 3 is a schematic sectional view of the battery housing tray 1 along A-A line in FIG. 2, the battery housing tray 1 housing the batteries 10 in the respective housing parts 15. As shown in FIG. 3, the battery housing tray 1 comprises a body 25, a plate-shaped permanent magnet 35, and an insulating resin 45. The body 25 has the side wall 60 (see FIG. 1) and the bottom plate 65, which are integrally formed by injection molding, for example. The mounting part 20 comprises a bottom plate 65 of the body 25, the permanent magnet 35, and the insulating resin 45. The shape of the permanent magnet 35 and the insulating resin 45 in plan view generally coincides with the shape of the bottom plate 65 in plan view.

The upper surface of the permanent magnet 35 is fixed to the entire surface of a bottom surface 65a of the bottom plate 65 by means of fixing, such as adhesive, and the insulating resin 45 is provided to coat all of the surface of a bottom surface 35a of the permanent magnet 35. The insulating resin 45 is preferably constituted of resin with excellent heat resistance, such as polytetrafluoroethylene (PTFE). The bottom plate 65, the permanent magnet 35, and the insulating resin 45 have through holes 65b, 35b, 45a which have the same cross-section as the through hole 37. The through hole 65b, the through hole 35b, and the through hole 45a are overlapped in Z direction in this order from above. The through hole 65b, the through hole 35b, and the through hole 45a together constitute the through hole 37. The permanent magnet 35 has a housing overlap part 35c that overlaps at least part of the housing part 15 as viewed in Z direction with respect to each of the plurality of housing parts 15.

Description is now given of the excellent operational effects demonstrated by the battery housing tray in the present disclosure, and also a spread fire test for confirming the operational effects and the result of the test.

The inventor of the present invention prepared the battery housing trays, each housing maximum storable batteries, stacked in three stages. One of the batteries on the battery housing tray of the middle stage was intentionally ignited and vented to examine the range of effect of the burned battery, in three different types of battery housing trays. Specifically, to examine the range of effect in the battery housing trays in Example 1, the battery housing trays in Example 2, and the battery housing trays in the comparative example, a spread fire test was conducted in each of these three types of battery housing trays.

[Battery Housing Trays in Example 1]

Figure 4A:
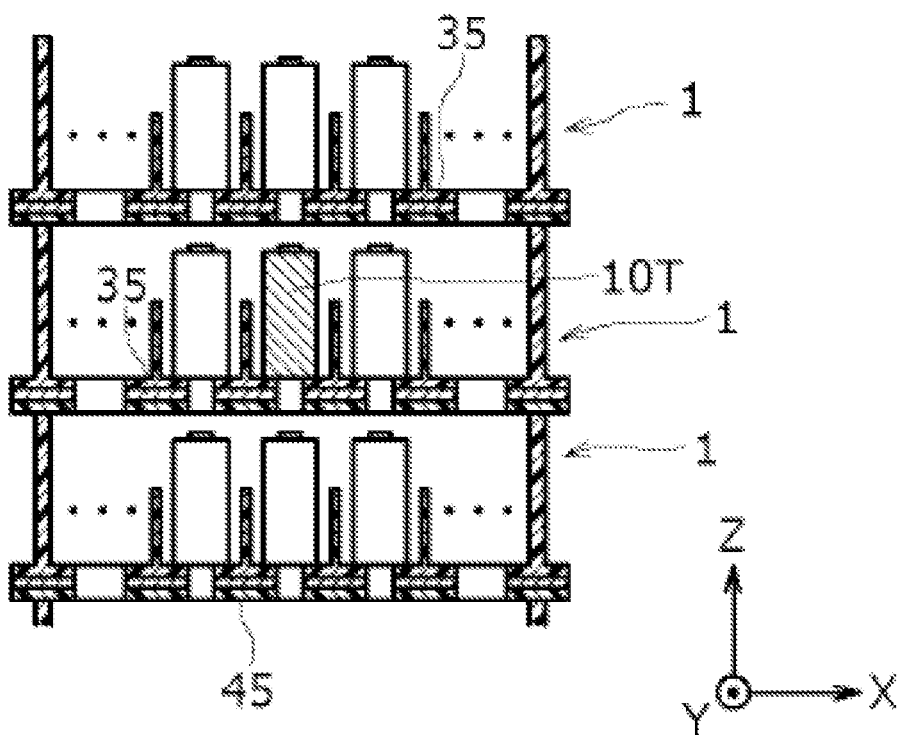
FIG. 4A is a schematic view showing the battery housing trays in Example 1 stacked in three stages.

As the battery housing trays in Example 1, the battery housing trays 1 described in detail with reference to FIGS. 1 to 3 were used. As shown in FIG. 4A, the battery housing trays 1 are stacked in three stages to conduct the test.

[Battery Housing Trays in Example 2]

Figure 4B:
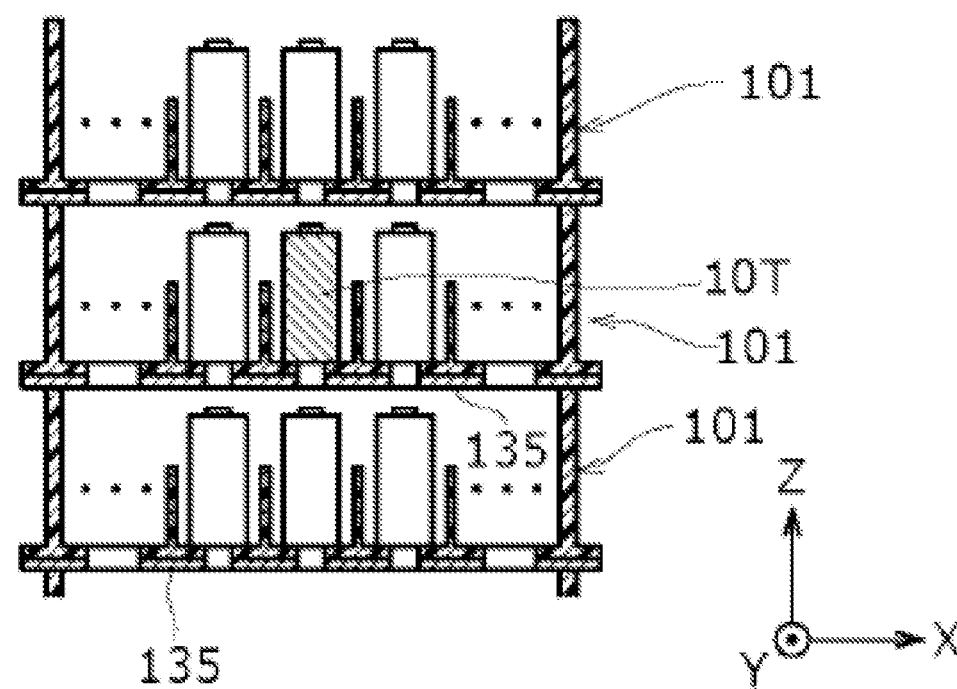
FIG. 4B is a schematic view showing the battery housing trays in Example 2 stacked in three stages.

As the battery housing trays in Example 2, battery housing trays 101 that are different from the battery housing trays 1 in Example 1 only in that a permanent magnet 135 not coated with insulating resin were used. As shown in FIG. 4B, the battery housing trays 101 were stacked in three stages to conduct the test.

[Battery Housing Trays in Comparative Example]

Figure 4C:
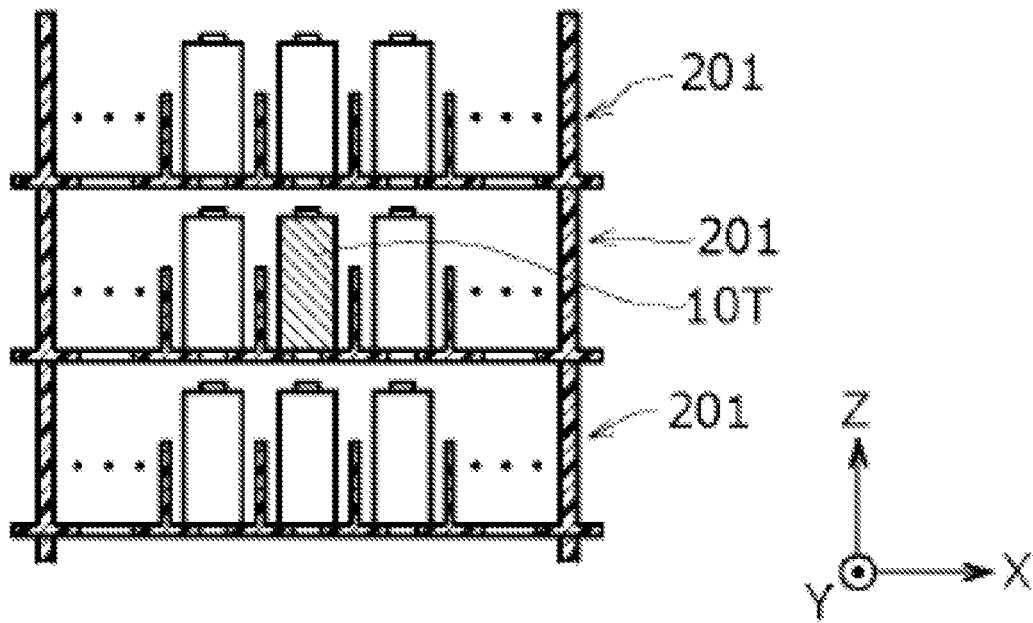
FIG. 4C is a schematic view showing the battery housing trays in a comparative example stacked in three stages.

As the battery housing trays in the comparative example, battery housing trays 201 that are different from the battery housing trays 1 in Example I only in that the permanent magnet and the insulating resin were not provided. As shown in FIG. 4C, the battery housing trays 201 were stacked in three stages to conduct the test.

<Fabrication of Batteries>

The batteries used for the spread fire test were fabricated as follows.

[Fabrication of Positive Electrode Plate]

As a positive-electrode active material, lithium nickelate ($LiNi_{0.88}Co_{0.09}Al_{0.03}O_2$) containing cobalt and aluminum was used. Then, the positive-electrode active material of 100 parts by mass, acetylene black of 1 parts by mass as a conductive agent, and polyvinylidene fluoride (PVDF) of 0.9 parts by mass as a binder were mixed in N-methylpyrrolidone (NMP) solvent to prepare positive-electrode slurry. The positive electrode slurry was uniformly applied to both surfaces of a 15 μm-thick aluminum foil. Next, the applied film was heat-treated in a heated dryer at temperature of 100 to 150° to remove NMP, and then compressed by a roll press machine. After compression, the electrode plate was held in contact with a roll that was heated to 200° C. for 5 seconds for heat treatment, and the electrode plate was cut to have a thickness of 0.144 mm, a width of 62.6 mm, and a length of 861 mm to fabricate a positive electrode plate.

[Fabrication of Negative Electrode Plate]

As a negative-electrode active material, graphite powder and Si oxide were mixed so as to contain graphite powder of 95 parts by mass and Si oxide of 5 parts by mass. Then, a negative-electrode active material of 100 parts by mass, a CMC of 1 part by mass as a thickener, and a styrene-butadiene rubber of 1 part by mass as a binder are dispersed into water to fabricate negative electrode slurry. The negative electrode slurry was applied to both surfaces of a negative electrode current collector made of an 8 μm-thick copper foil to form a negative electrode coated part. Then a coating film was dried and then compressed by the roll press machine to achieve a thickness of 0.160 mm. The compressed electrode plate was further cut into a width of 64.2 mm and a length of 959 mm to fabricate a negative electrode plate.

[Preparation of Non-Aqueous Electrolyte]

A non-aqueous electrolyte was prepared by dissolving 1.5 mol/liter of $LiPF_6$ in a mixed solvent (FEC:DMC=1:3 by volume ratio) consisting of fluoroethylene carbonate (FEC) and dimethyl carbonate (DMC).

<Fabrication of Cylindrical Batteries]

A positive electrode lead made of aluminum was attached to the positive electrode current collector, and a negative electrode lead made of nickel-copper-nickel was attached to the negative electrode current collector. The positive electrode plate and the negative electrode plate were then wound through a separator made of polyethylene to form a winding type electrode assembly. At that time, an outermost circumference of the electrode assembly was covered with a negative electrode core exposure part. Insulating plates were arranged at the top and bottom of the electrode assembly, and the electrode assembly was housed in a battery case having a ring-shaped engraving on a can bottom. The negative electrode lead was welded to the bottom of the battery case, and the positive electrode lead was welded to a sealing plate having a safety valve that is actuated with internal pressure. Then, a non-aqueous electrolyte was poured in the battery case, and an opening end of the battery case was caulked to the sealing plate via a gasket to fabricate a non-aqueous electrolyte secondary battery. The battery capacity was 4200 mAh.

<Spread Fire Test>

The batteries were housed in the respective battery housing trays, and the respective battery housing trays were stacked in three stages. An NiCr wire was wound around one of the batteries housed in the battery housing tray of the middle stage in the three-stage structure. A large current was applied to the NiCr wire to cause resistance heat generation so as to forcibly ignite the battery. Hereinafter, the battery that was forcibly ignited is referred to as a trigger battery. The trigger battery is a battery shown by slanted lines and designated by reference sign 10T in FIGS. 4A to 4C. In the test, after the trigger battery 10T was ignited, progress observation was performed to determine whether or not fire of the trigger battery extinguished or the fire spread to the batteries around the trigger battery.

[Test Result]

TABLE 1

|  | First | Second | Third |
|---|---|---|---|
| Example 1 | Good | Good | Good |
| Example 2 | Good | Good | Good |
| Comparative example | Bad | Bad | Good |

The test was performed three times in the respective battery housing trays 1, 101, and 201. The test result is shown in Table 1. In Table 1, "good" indicates that the fire of the trigger battery 10T extinguished without a spread fire, and "bad" indicates that the fire spread to the batteries around the trigger battery. As shown in Table 1, no spread fire occurred in the test using the battery housing trays 1 in Example 1. On the other hand, in the comparative example using the battery housing trays 201 without a magnet (see FIG. 4C), the spread fire occurred in two out of three tests.

Figures 5A, 5B, 5C:
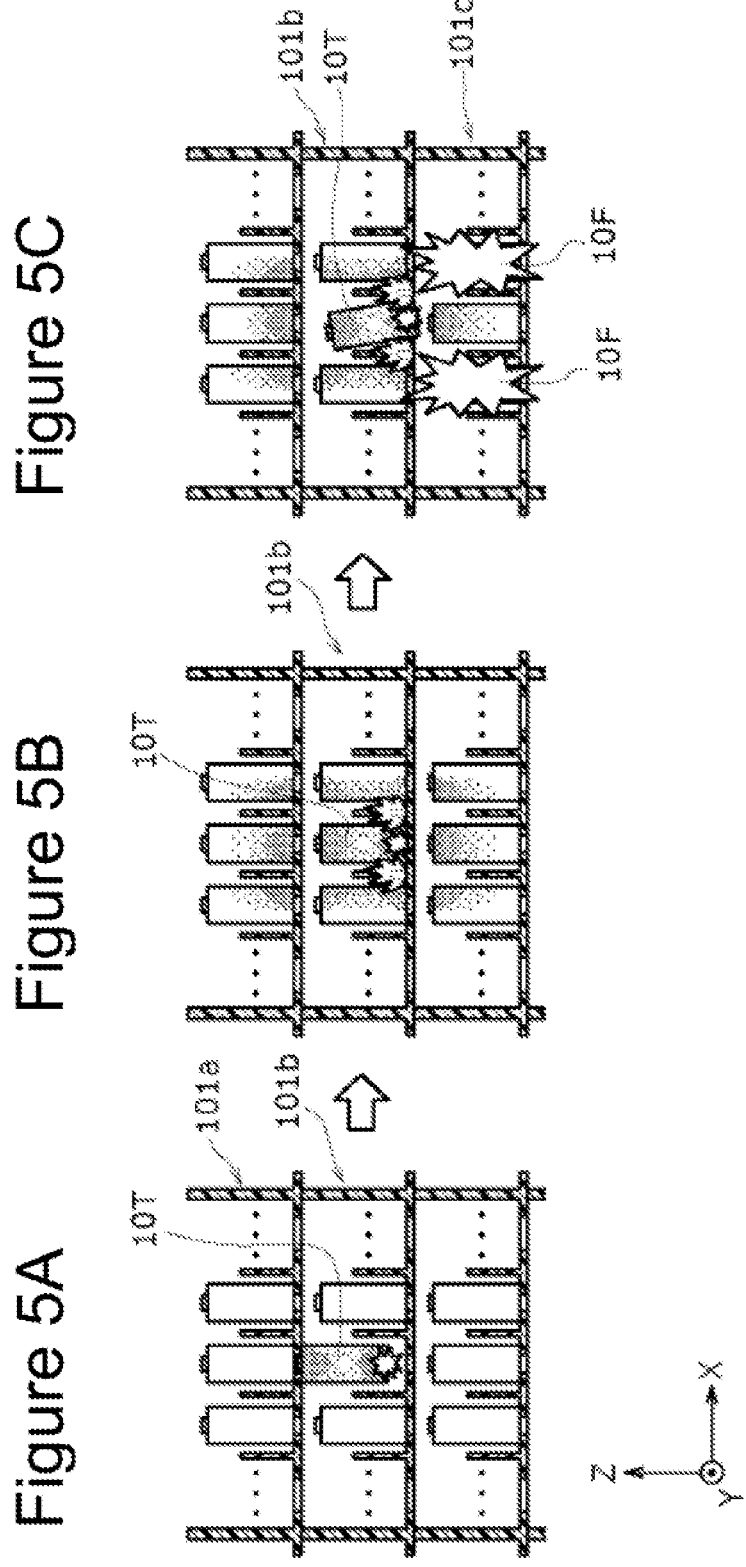
FIGS. 5A to 5C are schematic views describing the process of a spread fire in a test in which a trigger battery was forcibly ignited in battery housing trays stacked in three stages in a comparative example.

According to more detailed observations, the test using the battery housing trays 201 in the comparative example resulted in spread fire as shown in FIGS. 5A to 5C. In FIGS. 5A to 6B, regions of the batteries at high temperature are shown in gray. Specifically, in the test using the battery housing trays 201 in the comparative example, when the trigger battery 10T, with engraving on the can bottom, was ignited and the can bottom was vented, the trigger battery 10T jumped upward in Z direction as shown in FIG. 5A, hit the bottom of a battery housing tray 101a of the upper stage, and bounded back. The fire of the trigger battery 10T continued to touch the battery housing tray 101b of the middle stage, and the high-temperature trigger battery 10T continued to touch the battery housing tray 101b of the middle stage. As a result, the battery housing tray 101b of the middle stage was burned as shown in FIG. 5B. The battery housing tray 101b of the middle stage then melted. As shown in FIG. 5C, the trigger battery 10T fell, by its own weight, to the battery housing tray 101c of the lower stage through a melted part of the battery housing tray 101b of the middle stage, resulting in fire spreading to the plurality of batteries 10F housed in the battery housing tray 101c of the lower stage.

Figures 6A, 6B:
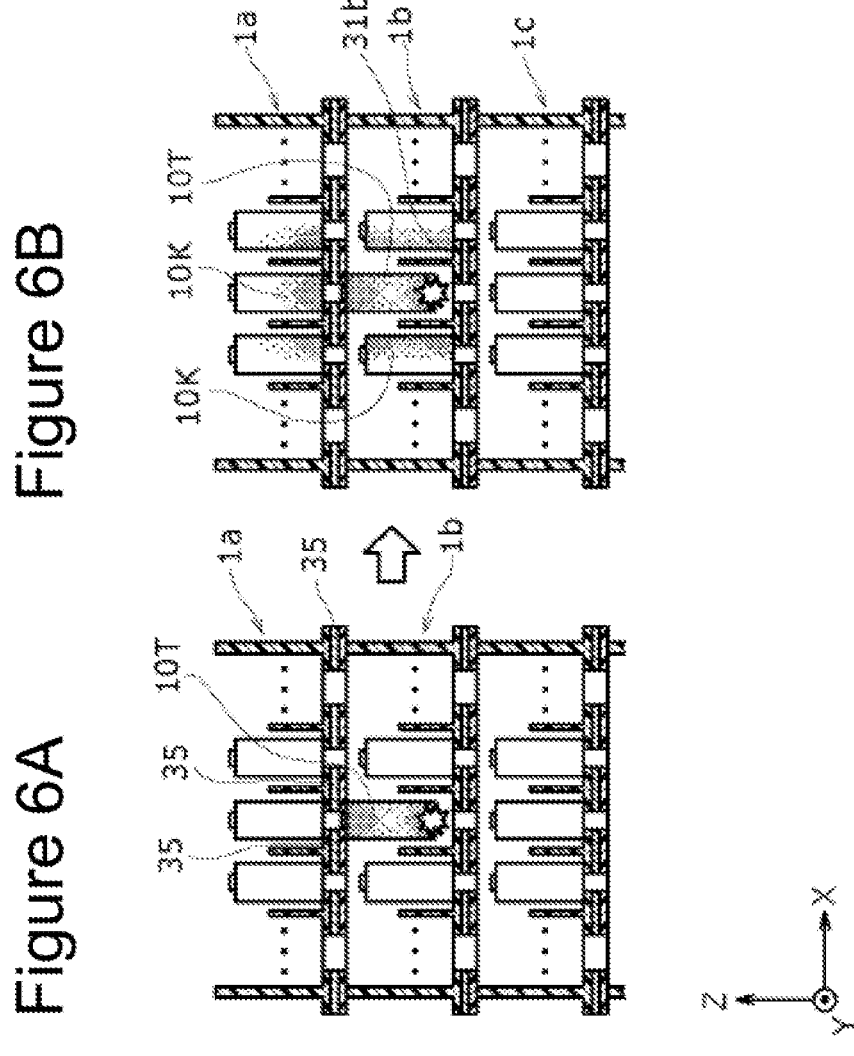
FIGS. 6A and 6B are schematic views describing the process that the fire of the trigger battery extinguished before being spread in the test in which the trigger battery was forcibly ignited in the battery housing trays stacked in three stages in the comparative example.

In contrast, in the test using the battery housing trays 1 in Example 1, the fire of the trigger battery 10T extinguished through the process shown in FIGS. 6A and 6B. Specifically, when the trigger battery 10T, with engraving on the can bottom, was ignited and the can bottom was vented, the trigger battery 10T jumped upward in Z direction as shown in FIG. 6A, and was attracted to the permanent magnet 35 in a battery housing tray 1a of the upper stage. Then, as shown in FIG. 6B, the trigger battery 10T was kept in the state of being raised from the upper surface 31b of a battery housing tray 1b of the middle stage. As a result of this behavior, the bottom side of the trigger battery 10T, which was at the highest temperature and was emitting fire, was not in contact with any of the battery housing trays 1a, 1b, and 1c, and although the temperature of batteries 10K around the trigger battery 10T increased, none of the batteries 10K were ignited. After that, the fire of the trigger battery 10T extinguished, and a spread fire did not occur.

Specifically, in the battery housing tray 1 in Example 1, the ignited trigger battery 10T was attracted to the bottom of the battery housing tray 1a of the upper stage due to the permanent magnet 35 disposed on the bottom, so that the battery housing tray 1b of the middle stage was suppressed from burning and melting, and the trigger battery 10T was suppressed from falling to the battery housing tray 1c of the lower stage. As a result, a spread fire did not occur and fire extinguished in a short period of time.

In Example 2 in which only the permanent magnet 135 (see FIG. 4B) was arranged on the bottom side of the battery housing tray 101 and the bottom side of the permanent magnet 135 was not coated with insulating resin, a spread fire did not occur. However, heat loss in the battery housing tray 101 after the test was more severe than in Example 1, and the plurality of batteries in the battery housing tray 101 were vented. It is presumed that when the trigger battery 10T was ignited, and the impact of ignition caused the surrounding batteries to jump up and be attracted to the bottom of the battery housing tray 101 of the upper stage, a short circuit occurred on the side of the battery sealing assembly via the permanent magnet 135, so that the short-circuited battery was vented and the electrolyte leaked out, which increased the force of the fire.

According to the above-described test result, it could be confirmed that when the battery housing trays, for housing batteries of a type having engraving on the can bottom, are stacked in stages, use of the battery housing trays of the present disclosure with the permanent magnet arranged on the bottom can suppress the effect of abnormal heat generation from being affecting other batteries, even if the abnormal heat generation should occur in any one of the batteries housed in the battery housing trays.

As is clear from this discussion, in the battery housing trays of each specification, the magnetic force of the permanent magnet needs to be set to such an extent that the batteries housed in the battery housing tray of a lower stage are not attracted to the permanent magnet arranged on the battery housing tray located one stage above, with respect to the battery housing trays stacked in a plurality of stages. In addition, in the battery housing trays of each specification, the magnetic force of the permanent magnet needs to be set to such an extent that the battery jumped upward due to ignition can be attracted to the magnet of the battery housing tray located one stage above.

[Configuration of Cylindrical Batteries in Present Disclosure and Operational Effects Thereof]

As described in the foregoing, the battery housing tray 1 in the present disclosure comprises: the bottom plate 65 that supports the plurality of batteries 10; the side wall 60 that defines the battery housing space 5 for housing the plurality of batteries 10 together with the bottom plate 65, the side wall 60 extending in a thickness direction of the bottom plate 65 from an outer edge of the upper surface 31 of the bottom plate 65 so as to surround the mounting surface 32 of the plurality of batteries 10; and the plate-shaped permanent magnet 35 fixed to at least part of the bottom surface 65a of the bottom plate 65.

According to the present disclosure, even when the can bottom of one battery 10 is vented and the battery 10 jumps upward in the state where the plurality of battery housing trays 1 are stacked in a plurality of stages with the plurality of batteries 10 being housed in each of the battery housing space 5, it is possible to attract the battery 10 to the permanent magnet 35 of the battery housing tray 1 located on the upper side. This makes it possible to greatly reduce the influence of high-temperature gas, emitted from the lower side of the pertinent battery 10, to be applied to the battery housing tray 1 or other batteries, and to significantly enhance the safety at the time such as transportation of the batteries 10.

[Preferably Adoptable Configuration of Cylindrical Battery and Operational Effects Thereof]

The battery housing tray 1 may also comprise the insulating resin 45 that coats at least part of the bottom surface 35a of the permanent magnet 35.

According to the above configuration, even when in the state where the plurality of battery housing trays 1 are stacked in a plurality of stages with the plurality of batteries 10 being housed in each of the battery housing space 5, the can bottom of one battery 10 is vented and the impact of venting causes the surrounding batteries 10 to jump up and be attracted to the bottom of the battery housing tray 1 of the upper stage, it is possible to prevent occurrence of a short circuit on the sealing assembly side of the battery 10 via the permanent magnet 35. Therefore, it is possible to prevent the force of fire from increasing due to a short-circuited battery being vented and the electrolyte leaking out, and it is possible to further enhance the safety.

Moreover, the battery housing space 5 comprises the plurality of housing parts 15 configured to house the batteries 10, respectively, and spaced from each other.

According to the above configuration, it is possible to position the housing positions of the batteries 10 in the battery housing tray 1. Therefore, the fixed position of the permanent magnet 35 which can effectively suck the batteries 10 can easily be specified.

The permanent magnet 35 may also have the housing overlap part 35c that overlaps at least part of the housing part 15 as viewed in the thickness direction with respect to each of the plurality of housing parts 15.

According to the above configuration, when the can bottom of a battery 10 is vented and the battery 10 jumps upward, the housing overlap part 35c of the permanent magnet 35 can reliably attract the battery 10, so that the safety can be further enhanced.

Moreover, the permanent magnet 35 may be fixed to a region on the bottom surface 35a including all the portions overlapped with the plurality of housing parts 15 in the thickness direction. The battery housing tray 1 may comprise the insulating resin 45 for coating all of the bottom surface 35*a* of the permanent magnet 35.

According to the above configuration, when one battery 10 jumps up due to abnormal heat generation, the permanent magnet 35 can reliably attract the battery 10, and the short-circuit of other batteries 10, which have jumped up due to the impact of the jumped-up battery 10, can also be reliably prevented, so that perfect safety is ensured.

It is to be understood that the present disclosure is not limited to the embodiments and modifications disclosed, and various modifications and changes are possible without departing from the scope of the claims of the present invention and any equivalents thereof.

For example, in the above embodiment, the permanent magnet 35 is fixed to the entire surface of the bottom surface 65*a* of the bottom plate 65, and the entire surface of the bottom surface 35*a* of the permanent magnet 35 is coated with the insulating resin 45. However, the magnet may be fixed to only part of the bottom surface of the bottom plate, and only part of the bottom surface of the magnet may be coated with insulating resin. Alternatively, it is not necessary to coat the bottom surface of the magnet with Insulating resin.

Description has been given of the case where the battery housing space 5 comprises the plurality of housing parts 15 configured to house the batteries 10, respectively, and spaced from each other. Description has also been given of the case where the permanent magnet 35 has the housing overlap part 35*c* that overlaps at least part of the plurality of respective housing parts 15 as viewed in the thickness direction of the bottom plate 65 with respect to the housing parts 15. However, the permanent magnet may not have the housing overlap part that overlaps at least part of the plurality of respective housing parts as viewed in the thickness direction of the bottom plate with respect to the housing parts.

In the above test, the trigger battery 10T, which was forcibly ignited, was a cylindrical battery having engraving on the can bottom for venting. Here, according to the test conducted by the inventor of the present invention, when the trigger battery to be forcibly ignited is a cylindrical battery that breaks on the sealing plate side (opposite to the bottom side) in the height direction, it can be confirmed that the fire of the forcibly ignited trigger battery extinguishes without occurrence of a spread fire in all of the battery housing tray 1 shown in FIG. 4A, the battery housing tray 101 shown in FIG. 4B, and the battery housing tray 201 shown in FIG. 4C. Therefore, using the battery housing tray in the present disclosure ensures safety even in the case of performing transportation, or other operation, of batteries of any specification.

REFERENCE SIGNS LIST

1, 1*a*, 1*b*, 1*c*, 101, 101*a*, 101*b*, 101*c* Battery housing tray, 5 Battery housing space, 10, 10F, 10K Battery, 10T Trigger battery, 15 Housing part, 31, 31*b* Upper surface, 32 Mounting surface, 35, 135 Permanent magnet, 35*a* Bottom surface of permanent magnet, 35*c* Housing overlap part, 45 Insulating resin, 60 Side wall, 65 Bottom plate, 65*a* Bottom surface of bottom plate.

The invention claimed is:

1. A battery housing tray, comprising:
a bottom plate that supports a plurality of batteries, wherein
a plurality of battery housing trays can be stacked in a plurality of stages, and
the plurality of battery housing trays includes the battery housing tray;
a side wall that defines a battery housing space for housing the plurality of batteries together with the bottom plate, the side wall extending in a thickness direction of the bottom plate from an outer edge of an upper surface of the bottom plate so as to surround a mounting surface of the plurality of batteries; and
a plate-shaped permanent magnet fixed to at least part of a bottom surface of the bottom plate, wherein
the plate-shaped permanent magnet has a magnetic force that does not attracts the plurality of batteries housed in the battery housing tray of a stage below of the plurality of stages, and
the magnetic force attracts one or more batteries of the plurality of batteries that jumped upward out of the battery housing tray of the stage below due to ignition.

2. The battery housing tray according to claim 1, comprising insulating resin coating at least part of the bottom surface of the permanent magnet.

3. The battery housing tray according to claim 1, wherein the battery housing space comprises a plurality of housing parts configured to house the batteries, respectively, and spaced from each other.

4. The battery housing tray according to claim 3, wherein the permanent magnet has a housing overlap part that overlaps at least part of the housing part as viewed in the thickness direction with respect to each of the plurality of housing parts.

5. The battery housing tray according to claim 4, wherein
the permanent magnet is fixed to a region on the bottom surface including all portions overlapped with the plurality of housing parts in the thickness direction, and
the battery housing tray comprises insulating resin that coats all of the bottom surface of the permanent magnet.

* * * * *